United States Patent

[11] 3,620,224

| [72] | Inventors | Graeme R. Quick; |
| | | Adhemar Bradini, both of Ames, Iowa |
| [21] | Appl. No. | 881,681 |
| [22] | Filed | Dec. 3, 1969 |
| [45] | Patented | Nov. 16, 1971 |
| [73] | Assignee | Iowa State University Research Foundation Ames, Iowa |

[54] VIBRATING CONCAVE FOR A COMBINE
5 Claims, 6 Drawing Figs.

| [52] | U.S. Cl. | 130/27 K |
| [51] | Int. Cl. | A01f 12/18 |
| [50] | Field of Search | 130/21, 22, 24, 25, 27, 27.9, 27.10, 27.4, 27.19, 13, 30 J |

[56] References Cited
UNITED STATES PATENTS

| 2,587,289 | 2/1952 | Cook | 130/30 J |
| 111,848 | 2/1871 | Jackson | 130/27.9 |
| 446,234 | 2/1891 | McDonald | 130/27 |
| 1,307,322 | 6/1919 | St. Clair | 130/13 |
| 1,764,040 | 6/1930 | Edwards | 130/27 |
| 1,826,752 | 10/1931 | Dugan | 130/27.9 |

FOREIGN PATENTS

| 893,472 | 1/1944 | France | 130/22 |

Primary Examiner—Antonio F. Guida
Attorney—Zarley, McKee & Thomte

ABSTRACT: A vibrating or reciprocating concave for a combine which is positioned adjacent the threshing cylinder to enhance the threshing action. The concave may either by reciprocated fore or aft or side to side. Reciprocating power for the concave is provided by means of a linkage means connecting the pivotally mounted concave with an eccentric mounted on the cylinder drive shaft. Means is also provided for adjusting the clearance between the reciprocating concave and the cylinder. A modified form of the device is also disclosed and comprises a movable threshing belt positioned above a flat concave.

PATENTED NOV 16 1971

3,620,224

INVENTORS
GRAEME R. QUICK
ADHEMAR BRANDINI
BY
Zarley, McKee & Thomte
ATTORNEYS

VIBRATING CONCAVE FOR A COMBINE

It is a principal object of this invention to provide a vibrating or a reciprocating concave for a combine or the like.

A further object of this invention is to provide a vibrating concave for a combine which enhances the threshing action of the combine.

A further object of this invention is to provide a vibrating concave for a combine which provides more efficient grain separation and threshing resulting in less loss.

A further object of this invention is to provide a vibrating concave for a combine which reduces the damage to the grain due to lower possible cylinder speed.

A further object of this invention is to provide a vibrating concave for a combine which reduces the power requirements needed to thresh the grain.

A further object of this invention is to provide a vibrating concave for a combine which provides the combine with increased capacity.

A further object of this invention is to provide a vibrating concave for a combine which is adapted to thresh a variety of crops.

A further object of this invention is to provide a vibrating concave for a combine which results in less straw or cob breakage.

A further object of this invention is to provide a vibrating concave for a combine which is economically manufactured and durable in use.

Figure 1:
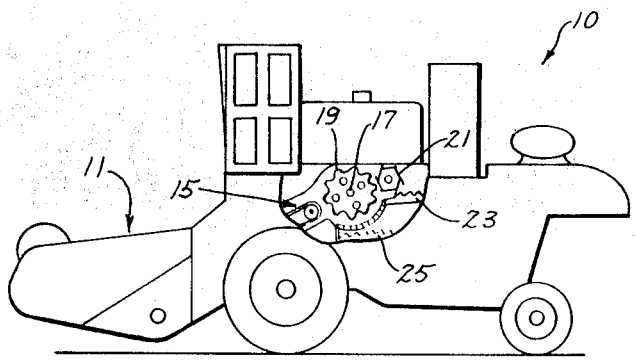
FIG. 1 is a side view of a conventional combine with portions thereof cut away to illustrate this invention.

In FIG. 1, the numeral 10 indicates generally a combine including a header unit 11 adapted to cut or pick up the grain and convey the same to a threshing cylinder 13 by means of conveyor means 15. Cylinder 13 comprises a drive shaft 17 having a plurality of cylinder or rasp bars 19 provided thereon in conventional fashion. The numeral 21 refers to a conventional beater rotatably mounted behind the cylinder 13 while the numeral 23 refers to a reciprocating straw rack or walker. A grain pan 25 is reciprocatably mounted below the cylinder 13 as illustrated in FIG. 2.

Figure 2:
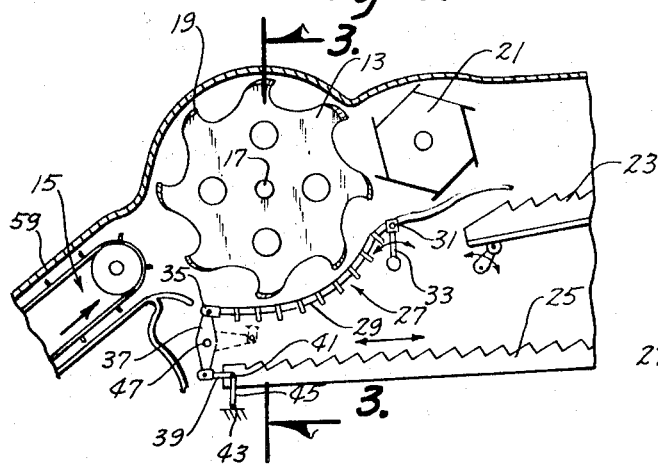
FIG. 2 is a sectional view illustrating the vibrating conveyor and its associated structure.
Figure 3:
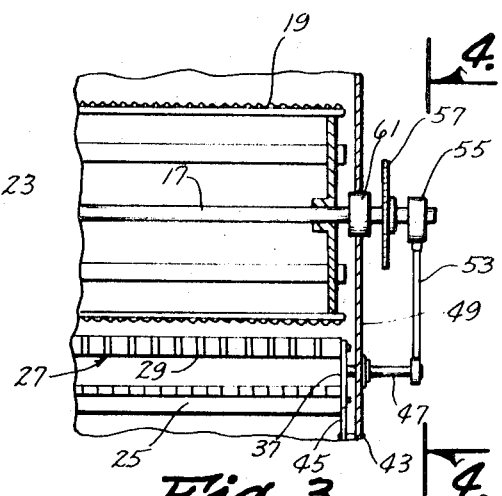
FIG. 3 is a sectional view as seen along lines 3—3 of FIG. 2.

In FIGS. 2 and 3, the numeral 27 designates an arcuate concave having a plurality of spaced-apart concave bars 29. The rearward end of the concave 27 is pivotally connected at its rearward end 31 to the upper end of an arm 33 which is pivotally connected about a horizontal axis to the combine. An arm 33 would be provided at each side of the concave 27 at the rearward end thereof. The forward end 35 of concave 27 is pivotally connected to the upper end of a link 37 which extends downwardly therefrom. A link 37 is provided at each side of the concave 27 to provide the necessary support for the concave 27. The lower end of link 37 is pivotally connected to a finger 39 which is pivotally connected to the grain pan 25 at 41. As seen in FIG. 2, finger 39 and the grain pan 25 are pivotally connected to the combine at 43 by means of a finger 45. Shaft 47 is connected to link 37 as indicated in FIG. 2 and extends outwardly through the side 49 of the combine as illustrated in FIG. 3.

Figure 4:
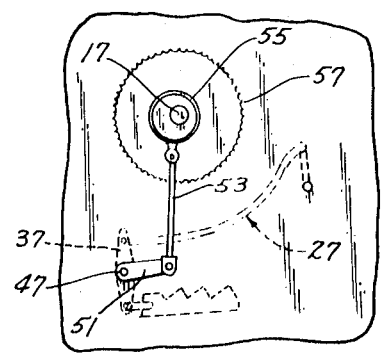
FIG. 4 is a view as seen along lines 4—4 of FIG. 3, the broken lines indicating the concave and associated structure.

An arm 51 is rigidly connected at one end t0 the outer end of the shaft 47 and is pivotally connected at its other end to a crank or tie rod 53. The upper end of tie rod 53 is pivotally connected to an eccentric 55 which is mounted on the outer end of shaft 17 as illustrated in FIGS. 3 and 4. The numeral 57 designates a sprocket or the like which is mounted on the shaft 17 to provide rotational driving force to the shaft 17 and the cylinder 13.

The operation of the embodiment of FIGS. 2, 3 and 4 is as follows. The grain is cut by the header unit 11 and conveyed upwardly through the housing 59 to the cylinder 13 which is being rotated in a counterclockwise direction as viewed in FIG. 2. The bars 19 engage the grain and force the same rearwardly between the cylinder and the concave 27. The rotation of the shaft 27 imparts fore and aft reciprocating or vibrational movement to the concave 27 through the eccentric 55, tie rod 53, arm 51, shaft 47, and link 37. The fact that the grain pan 25 is pivotally linked to the concave 27 serves as a counterbalance for the concave and would be vibrated or reciprocated in a rearward direction as the concave 27 is moved forwardly or in an opposite direction. When the concave is being moved rearwardly, the grain pan 25 is being moved forwardly and such opposing movements of the concave and grain pan counterbalance the apparatus. The cylinder 13 is adjustably movably mounted in the combine by means of the slidable bearings 61 and such adjustment permits the clearance between the cylinder and concave to be varied depending upon the particular grain being threshed.

The grain is forced through the concave 27 and drops on the reciprocating pan 25 and is conveyed rearwardly to the conventional components of the combine. The straw is passed rearwardly from the conveyor 27 to the beater 21 and to the strawwalkers 23.

Figure 5:
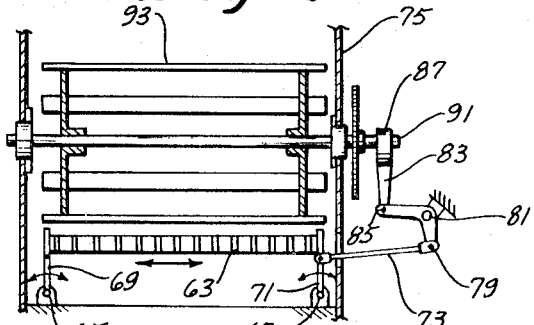
FIG. 5 is a sectional view similar to FIG. 3 but which illustrates a modified form of the concave.

FIG. 5 illustrates a modified form of the device, the principal difference being that the concave 63 in FIG. 5 is reciprocated or vibrated in a side-to-side manner rather than the fore-and-aft manner illustrated in FIGS. 2 and 3. As seen in FIG. 5, the concave 63 is pivotally connected at 65 and 67 to the combine by means of arms 69 and 71. Arm 71 is pivotally connected to a tie or crank rod 73 extending outwardly through the side 75 of the combine. The outer end of rod 73 is pivotally connected to a link 77 at 79. Link 77 is pivotally connected to the combine at 81 and is pivotally connected to a rod 83 at 85. The upper end of rod 83 is operatively connected to an eccentric 87 mounted on the outer end of the shaft 91 of cylinder 93. In FIG. 5, rotation of the shaft 91 causes the rod 83 to be reciprocated upwardly and downwardly which causes the link 77 to be pivoted about 81 thereby causing the rod 73 to pivot the concave 63 in the directions indicated by the arrows.

Figure 6:
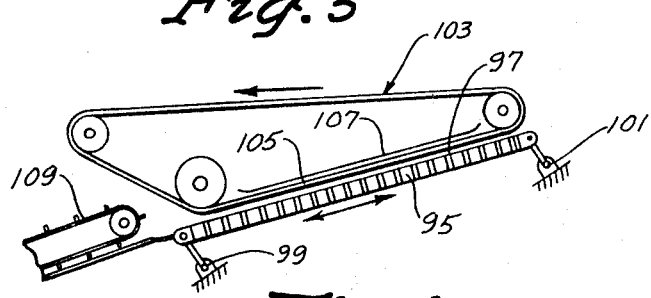
FIG. 6 is a side view of a modified form of the device.

A further modified form of the invention is illustrated in FIG. 6 wherein the numeral 95 designates an elongated concave having a substantially flat upper surface 97. The rearward and forward ends of the concave 95 are pivotally connected to the combine at 99 and 101 as illustrated in FIG. 6. The numeral 103 refers generally to a threshing means which is of the endless type such as a belt or chain type. Threshing means 103 includes a belt portion 105 which is parallel to the top 97 of concave 95 and is spaced therefrom as illustrated in FIG. 6. A plate 107 maintains the belt portion 105 in the parallel position to concave 95 and prevents the belt portion 105 from moving away from the concave as material is passed therebetween.

The grain is fed upwardly to the forward ends of the threshing means 103 and concave 95 by conveyor means 109 and the same is forced between the reciprocating concave 95 and the moving threshing means 103. The threshing means 103 is mounted on the pulleys shown in FIG. 6 and would be powered by any conventional means. Likewise, the reciprocating movement of concave 95 would also be provided by any convenient means. As the grain is moved between the belt portion 105 and the reciprocating or vibrating concave 95, the grain is threshed with a portion of the grain passing downwardly through the concave 95 and the straw portion of the grain being passed rearwardly from the concave 95. If desired, the threshing means 103 could be provided with chains and spaced-apart bars.

In each of the embodiments illustrated in the drawings and disclosed hereinbefore, the threshing action of the grain is enhanced by the vibrating concave. The interaction of the cylinder and vibrating concave results in more efficient grain separation and threshing thereby resulting in less grain loss. The vibrating concave permits the cylinder to be rotated at a speed slower than is conventional which results in less damage to the grain. The vibrating concave by enhancing the threshing action results in less power being required to thresh the grain and also results in providing a higher threshing capacity to conventional combines. The adjustability of the clearance between the cylinder and vibrating concave insures that the apparatus may be used for a wide variety of crops.

Additionally, the fact that the cylinder may be rotated at a slower speed results in less straw breakage and cob breakage thereby providing easier subsequent cleaning of the grain. The increased separation and threshing provided by the vibrating conveyor permits combines to be manufactured having a reduced area for cleaning and separating. Further the vibrating concave avoids the need of a beater apparatus which is normally positioned behind the cylinder.

While the vibrating concaves of this invention have been described as deriving their power through connection with the cylinder, it should be noted that the concave does not have to be connected and driven by the cylinder. The concaves may be powered by a separate power means since it is possible that situations would arise when the cylinder speed would need to be varied from that of the concave. The same is also true for the grain pan.

Preferably, means should also be provided for varying the angles of the concave supporting legs in order to impart different motions to the particles on the concave, such as pitching, either against or towards the cylinder.

Thus, in each of the embodiments described, a vastly superior threshing action is provided. It can therefore be seen that the invention accomplishes at least all of its stated objectives.

We claim:
1. In a grain combine, comprising:
a powered, rotatable threshing cylinder,
an arcuate concave means positioned adjacent said cylinder,
said concave means being reciprocally movably mounted with respect to said cylinder,
power means connected to said concave means to reciprocate said concave means while said cylinder is rotating whereby the grain will be passed between said cylinder and said reciprocating concave means to cause the threshing of the same,
said cylinder including a rotatable drive shaft, said power means comprising a linkage means connecting said drive shaft and said concave means.

2. The combine of claim 1 wherein said drive shaft has an eccentric means connected to one end thereof, said concave means being pivotally mounted, said linkage means pivotally connecting said eccentric means and said concave means whereby said concave means will be reciprocated as said drive shaft rotates.

3. In a grain combine, comprising:
a powered, rotatable threshing cylinder
an arcuate concave means positioned adjacent said cylinder,
said concave means being reciprocally movably mounted with respect to said cylinder,
power means connected to said concave means to reciprocate said concave means while said cylinder is rotating whereby the grain will be passed between said cylinder and said reciprocating concave means to cause the threshing of the same,
the reciprocating movement of said concave means being fore and aft with respect to said combine,
and a reciprocating grain tray positioned below said concave means,
said grain tray being connected to said concave means by a linkage means whereby said grain tray and said concave means will be reciprocated in opposite directions.

4. In a grain combine, comprising,
a reciprocating concave means having a substantially flat upper end, and rearward and forward ends,
an endless belt-type threshing means having rearward and forward ends movably positioned above said flat upper end of said concave means and including a first belt portion which is parallel to said flat upper end and spaced therefrom, said first belt portion moving rearwardly with respect to said concave means, for conveying the grain to be threshed to the forward ends of said concave means and said threshing means,
said first belt portion forcing the grain against the reciprocating concave means whereby a portion of the grain will be passed through the concave means and whereby the remainder of the grain will be passed rearwardly over the concave means,
and means disposed intermediate said rearward and forward ends for maintaining said first belt portion in a parallel relationship to said concave means as the grain is passed therebetween.

5. In a grain combine, comprising;
a powered, rotatable threshing cylinder,
an arcuate concave means positioned adjacent said cylinder,
said concave means being reciprocally movably mounted with respect to said cylinder,
power means connected to said concave means to reciprocate said concave means while said cylinder is rotating whereby the grain will be passed between said cylinder and said reciprocating concave means to cause the threshing of the same,
said reciprocating movement of said concave means being fore and aft with respect to said combine.

* * * * *